United States Patent
Wijnands et al.

(10) Patent No.: US 9,712,458 B2
(45) Date of Patent: Jul. 18, 2017

(54) CONSOLIDATION ENCODINGS REPRESENTING DESIGNATED RECEIVERS IN A BIT STRING

(71) Applicants: Ijsbrand Wijnands, Leuven (BE); Gregory J. Shepherd, Eugene, OR (US); Neale David Raymond Ranns, Basingstoke (GB); Stewart Frederick Bryant, Merstham (GB)

(72) Inventors: Ijsbrand Wijnands, Leuven (BE); Gregory J. Shepherd, Eugene, OR (US); Neale David Raymond Ranns, Basingstoke (GB); Stewart Frederick Bryant, Merstham (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/684,415

(22) Filed: Apr. 12, 2015

(65) Prior Publication Data
US 2016/0301628 A1    Oct. 13, 2016

(51) Int. Cl.
*H04L 12/931* (2013.01)
(52) U.S. Cl.
CPC .................................. *H04L 49/201* (2013.01)
(58) Field of Classification Search
CPC ... H04L 69/22; H04L 65/4076; H04L 45/745; H04L 45/72; H04L 49/201; H04L 49/15;

(Continued)

(56) References Cited

U.S. PATENT DOCUMENTS

2002/0186154 A1*  12/2002  Cheung ................... H03M 7/40
                                                  341/67
2003/0223372 A1*  12/2003  Sanchez ............... H04L 12/1886
                                                  370/237

(Continued)

OTHER PUBLICATIONS

Wijnands et al., "Multicast using Bit Index Explicit Replication," Dec. 4, 2014, draft-wijnands-bier-architecture-02, The Internet Society, Reston, VA (twenty-seven pages).

(Continued)

*Primary Examiner* — Mohamed Kamara
(74) *Attorney, Agent, or Firm* — The Law Office of Kirk D. Williams

(57) ABSTRACT

In one embodiment, for each particular multicast flow of a plurality of multicast flows of packets a particular consolidation encoding of a plurality of consolidation encodings is selected based on the sparseness of bit positions within a bit string corresponding to designated receiving packet switching devices of the particular multicast flow. The packet switching device sends one or more packets corresponding to said particular packet, with each of these one or more packets including designated receiving packet switching devices of the particular multicast flow in the header of said particular packet according to the particular consolidation encoding. In one embodiment, different consolidation encodings of the plurality of consolidation encodings are used for at least two different multicast flows of the plurality of multicast flows of packets. In one embodiment, each of said receiving packet switching devices is Bit Index Explicit Replication (BIER) Bit-Forwarding Router (BFR).

20 Claims, 7 Drawing Sheets

(58) Field of Classification Search
CPC ..... H04L 65/102; H04L 47/15; H04L 49/351; H04L 12/00; H04L 12/46; H04L 12/462; H04L 29/06455; H04L 63/1408
See application file for complete search history.

(56) References Cited

U.S. PATENT DOCUMENTS

| | | | |
|---|---|---|---|
| 2011/0044171 A1* | 2/2011 | Csaszar | H04L 12/18 370/235 |
| 2015/0078378 A1* | 3/2015 | Wijnands | H04L 45/50 370/390 |
| 2015/0078379 A1 | 3/2015 | Wijnands et al. | |
| 2016/0127142 A1* | 5/2016 | Tian | H04L 12/1886 370/390 |
| 2016/0134535 A1* | 5/2016 | Callon | H04L 45/48 370/390 |

OTHER PUBLICATIONS

Wijnands et al., "Encapsulation for Bit Index Explicit Replication in MPLS Networks," Dec. 4, 2014, draft wijnands-mpls-bier-encapsulation-02, The Internet Society, Reston, VA (thirteen pages).
Albert Tian, "[Bier] blocked based encoding and list based encoding for BIER," Nov. 6, 2014, Bit Indexed Explicit Replication discussion list, The Internet Society, Reston, VA (fifteen pages).

* cited by examiner

CONSOLIDATION ENCODINGS REPRESENTING DESIGNATED RECEIVERS IN A BIT STRING

TECHNICAL FIELD

The present disclosure relates generally to packet switching devices in a network, including packet switching devices that vary consolidation encodings representing designated receivers in a bit string.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology, which often uses longest prefix matching of an Internet Protocol (IP) packet's destination address in determining how to forward the IP packet.

BRIEF DESCRIPTION OF THE DRAWINGS

The appended claims set forth the features of one or more embodiments with particularity. The embodiment(s), together with its advantages, may be understood from the following detailed description taken in conjunction with the accompanying drawings of which:

DESCRIPTION OF EXAMPLE EMBODIMENTS

1. Overview

Figure 1:
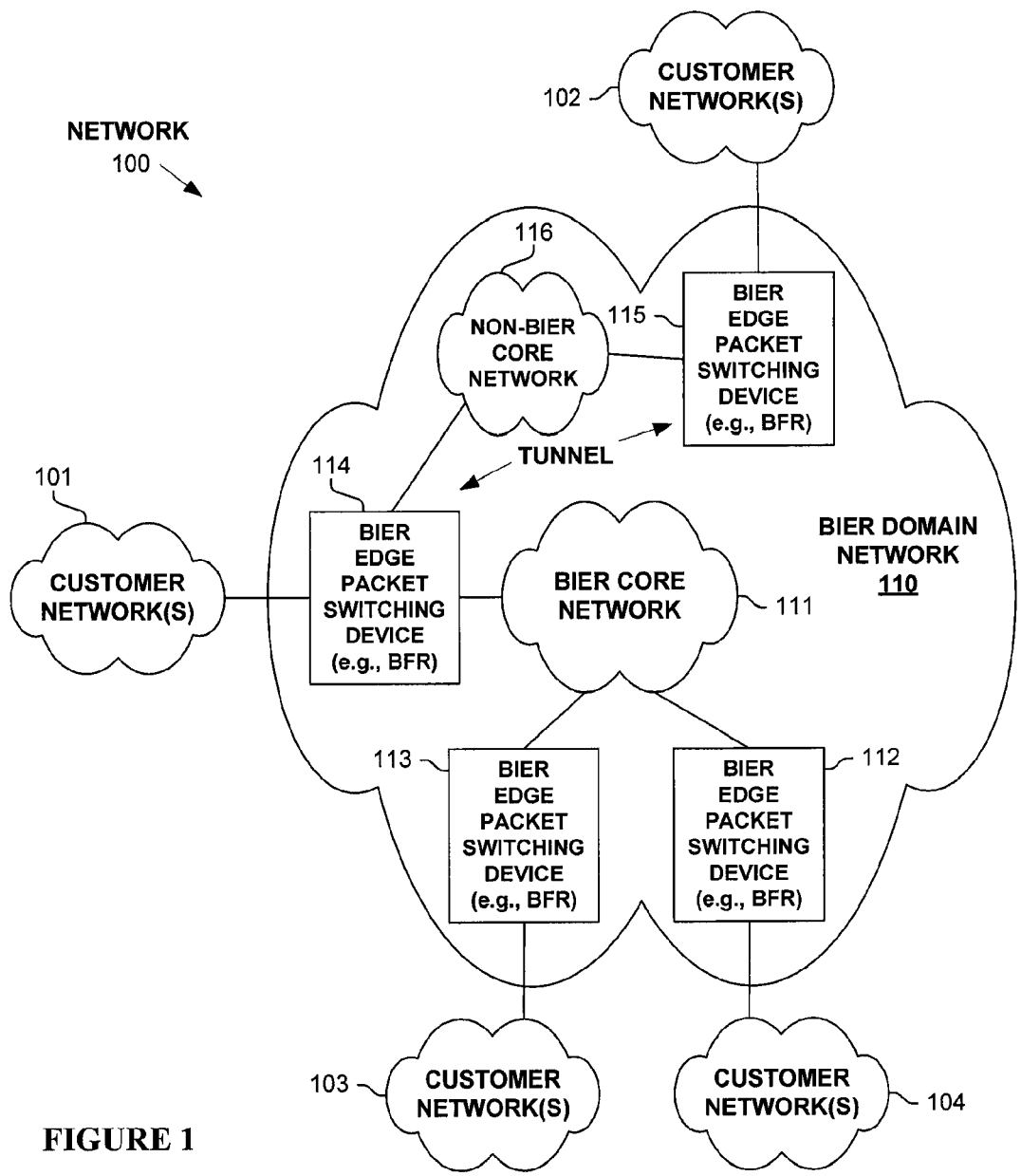
FIG. 1 illustrates a network operating according to one embodiment.

Disclosed are, inter alia, methods, apparatus, computer-storage media, mechanisms, and means associated with consolidation encodings representing designated receivers in a bit string.

One embodiment includes a method, comprising: performing operations by a packet switching device, with said operations comprising for each particular multicast flow of a plurality of multicast flows of packets: selecting a particular consolidation encoding of a plurality of consolidation encodings based on the sparseness of bit positions within a bit string corresponding to designated receiving packet switching devices of the particular multicast flow, and sending, from the packet switching device, one or more packets corresponding to said particular packet, with each of these one or more packets including designated receiving packet switching devices of the particular multicast flow in the header of said particular packet according to the particular consolidation encoding.

One embodiment includes a method, comprising: performing operations by a particular packet switching device, with said operations including: receiving a particular packet including a bitmap designating a plurality of receiving packet switching devices in the header of the particular packet; determining that the plurality of receiving packet switching devices are to be reached by at least two different next hop packet switching devices from the particular packet switching device; and for each particular next hop packet switching device of said at least two different next hop packet switching devices, selecting a particular consolidation encoding of a plurality of consolidation encodings based on the sparseness of bit positions within a bit string corresponding to designated receiving packet switching devices to be reached via said particular next hop packet switching device, and sending a particular packet to said particular next hop packet switching device with the particular packet including said designated receiving packet switching devices to be reached via said particular next hop packet switching device in the header of said particular packet according to the particular consolidation encoding.

In one embodiment, different consolidation encodings of the plurality of consolidation encodings are used for at least two different multicast flows of the plurality of multicast flows of packets. In one embodiment, each of said two different consolidation encodings is a uniform consolidation encoding using a same manner of encoding portions of the bit string. In one embodiment, at least one of said two different consolidation encodings is a consolidation encoding using at least two different manners of encoding portions of the bit string. In one embodiment, each of said receiving packet switching devices is Bit Index Explicit Replication (BIER) Bit-Forwarding Router (BFR). In one embodiment, the packet switching device is a BIER edge packet switching device.

2. Description

Disclosed are, inter alia, methods, apparatus, computer-storage media, mechanisms, and means associated with consolidation encodings representing designated receivers in a bit string. Embodiments described herein include various elements and limitations, with no one element or limitation contemplated as being a critical element or limitation. Each of the claims individually recites an aspect of the embodiment in its entirety. Moreover, some embodiments described may include, but are not limited to, inter alia, systems, networks, integrated circuit chips, embedded processors, ASICs, methods, and computer-readable media containing instructions. One or multiple systems, devices, components, etc., may comprise one or more embodiments, which may include some elements or limitations of a claim being performed by the same or different systems, devices, components, etc. A processing element may be a general processor, task-specific processor, a core of one or more processors, or other co-located, resource-sharing implementation for performing the corresponding processing. The embodiments described hereinafter embody various aspects and configurations, with the figures illustrating exemplary and non-limiting configurations. Computer-readable media and means for performing methods and processing block operations (e.g., a processor and memory or other apparatus configured to perform such operations) are disclosed and are in keeping with the extensible scope of the embodiments.

The term "apparatus" is used consistently herein with its common definition of an appliance or device.

The steps, connections, and processing of signals and information illustrated in the figures, including, but not limited to, any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc., are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps. Finally, the term "particular machine," when recited in a method claim for performing steps, refers to a particular machine within the 35 USC §101 machine statutory class.

One embodiment include a method comprising: performing operations by a packet switching device, with said operations comprising for each particular multicast flow of a plurality of multicast flows of packets: selecting a particular consolidation encoding of a plurality of consolidation encodings based on the sparseness of bit positions within a bit string corresponding to designated receiving packet switching devices of the particular multicast flow; and sending, from the packet switching device, one or more packets corresponding to said particular packet, with each of these one or more packets including designated receiving packet switching devices of the particular multicast flow in the header of said particular packet according to the particular consolidation encoding.

In one embodiment, different consolidation encodings of the plurality of consolidation encodings are used for at least two different multicast flows of the plurality of multicast flows of packets. In one embodiment, each of said two different consolidation encodings is a uniform consolidation encoding using a same manner of encoding portions of the bit string. In one embodiment, at least one of said two different consolidation encodings is a varying consolidation encoding using at least two different manners of encoding portions of the bit string. In one embodiment, each of said receiving packet switching devices is Bit Index Explicit Replication (BIER) Bit-Forwarding Router (BFR). In one embodiment, the packet switching device is a BIER edge packet switching device.

One embodiment includes a method comprising: performing operations by a particular packet switching device, with said operations including: receiving a particular packet including a bitmap designating a plurality of receiving packet switching devices in the header of the particular packet; determining that the plurality of receiving packet switching devices are to be reached by at least two different next hop packet switching devices from the particular packet switching device; and for each particular next hop packet switching device of said at least two different next hop packet switching devices, selecting a particular consolidation encoding of a plurality of consolidation encodings based on the sparseness of bit positions within a bit string corresponding to designated receiving packet switching devices to be reached via said particular next hop packet switching device, and sending a particular packet to said particular next hop packet switching device with the particular packet including said designated receiving packet switching devices to be reached via said particular next hop packet switching device in the header of said particular packet according to the particular consolidation encoding.

In one embodiment, for at least one next hop packet switching device which is not a Bit Index Explicit Replication (BIER) Bit-Forwarding Router (BFR) of said at least two different next hop packet switching devices the operation of sending the particular packet includes encapsulating said particular packet and sending said encapsulated particular packet through a tunnel to one of said designated receiving packet switching devices. In one embodiment, different consolidation encodings of the plurality of consolidation encodings are used for at least two different multicast flows of the plurality of multicast flows of packets. In one embodiment, each of said two different consolidation encodings is a uniform consolidation encoding using a same manner of encoding portions of the bit string. In one embodiment, at least one of said two different consolidation encodings is a varying consolidation encoding using at least two different manners of encoding portions of the bit string. In one embodiment, each of said receiving packet switching devices is Bit Index Explicit Replication (BIER) Bit-Forwarding Router (BFR). In one embodiment, the packet switching device is a BIER edge packet switching device. In one embodiment, for at least one next hop packet switching device of said at least two different next hop packet switching devices the operation of sending the particular packet includes encapsulating said particular packet and sending said encapsulated particular packet through a tunnel to one of said designated receiving packet switching devices.

One embodiment includes a packet switching device, comprising: a plurality of interfaces configured to send and receive packets; and one or more packet switching mechanisms configured to packet switch packets among said interfaces. In one embodiment, the packet switching device is configured to perform operations, with said operations including for each particular multicast flow of a plurality of multicast flows of packets: selecting a particular consolidation encoding of a plurality of consolidation encodings based on the sparseness of bit positions within a bit string corresponding to designated receiving packet switching devices of the particular multicast flow, and sending, from the packet switching device, one or more packets corresponding to said particular packet, with each of these one or more packets including designated receiving packet switching devices of the particular multicast flow in the header of said particular packet according to the particular consolidation encoding.

In one embodiment, different consolidation encodings of the plurality of consolidation encodings are used for at least two different multicast flows of the plurality of multicast flows of packets. In one embodiment, each of said two different consolidation encodings is a uniform consolidation encoding using a same manner of encoding portions of the bit string. In one embodiment, at least one of said two different consolidation encodings is a varying consolidation encoding using at least two different manners of encoding portions of the bit string. In one embodiment, each of said receiving packet switching devices is Bit Index Explicit Replication (BIER) Bit-Forwarding Router (BFR). In one embodiment, the packet switching device is a BIER edge packet switching device.

FIG. 1 illustrates a network 100 operating according to one embodiment. Multicast packets are forwarded through network 100, possibly using Bit Index Explicit Replication (BIER).

When a multicast data packet enters the BIER multicast domain 110, the ingress edge router determines the set of egress edge routers to which the packet is to be sent. The ingress edge router then encapsulates the packet in a BIER header and sends one or more copies of the packet through the network. Although one embodiment is described in terms of BIER networks and routers, embodiments are not limited to BIER-based implementations.

As shown in FIG. 1, network 100 includes customer networks 101-104, and BIER domain network 110 including BIER edge Bit-Forwarding Routers (BFRs) 112-115, with a BIER core network 111 (including BFRs) and a non-BIER core network 116 not supporting BIER (e.g., such as in a network in the process of upgrading their routers with BIER capability).

In a previous implementation, the BIER header contains a "BitString" in which each bit represents exactly one egress edge router in the domain. Thus, if there are four thousand routers in the domain, then the BitString is four thousand bits long, and with the set of egress routers to send the packet identified by corresponding bits set in the BIER header.

Sending the full-size BitString in the BIER header is not scalable. Moreover, a small subset of the egress edge routers in a BIER domain may be the recipients of a multicast packet. For example, a multicast packet may only be sent to only three of the four thousand edge BFRs. Thus, only three of the four thousand bits will be set. Also, network administrators may not assign contiguous BIER addresses (e.g., BFR-IDs) so that the bits corresponding to the BFRs are distributed in the BitString.

Figure 2A:
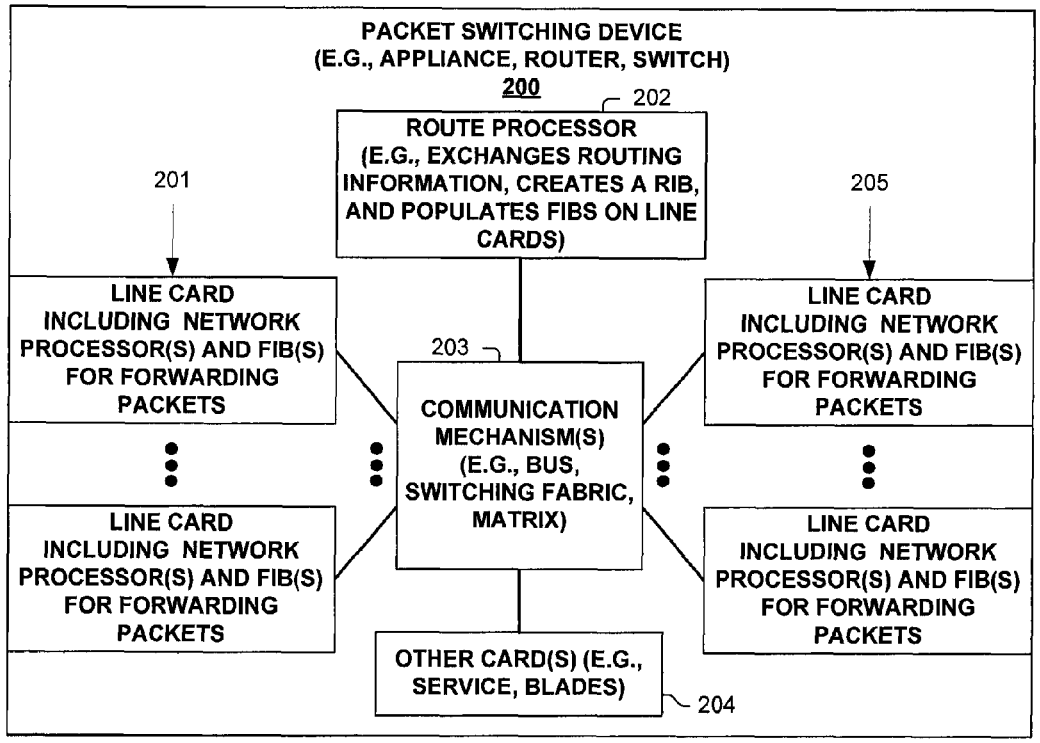
FIG. 2A illustrates a packet switching device according to one embodiment.
Figure 2B:
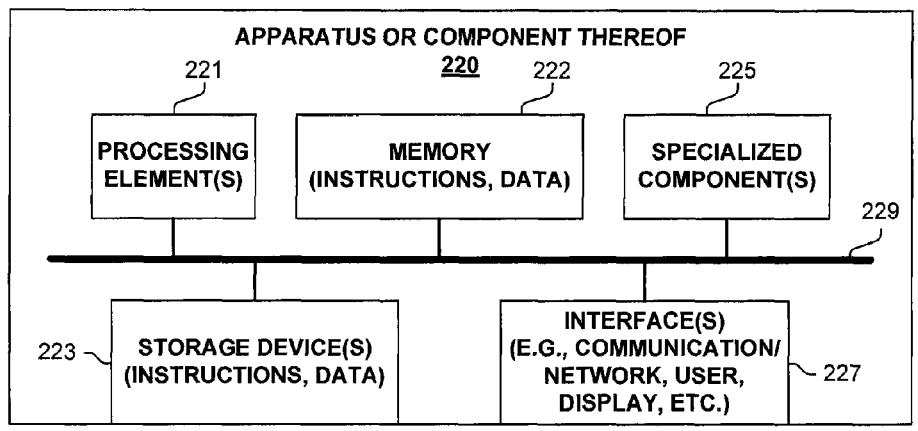
FIG. 2B illustrates an apparatus according to one embodiment.

FIGS. 2A-B and their discussion herein are intended to provide a description of various exemplary packet switching systems used according to one embodiment. One embodiment of a packet switching device 200 is illustrated in FIG. 2A. As shown, packet switching device 200 includes multiple line cards 201 and 205, each with one or more network interfaces for sending and receiving packets over communications links (e.g., possibly part of a link aggregation group), and with one or more processing elements that are used in one embodiment associated with consolidation encodings representing designated receivers in a bit string. Packet switching device 200 also has a control plane with one or more processing elements 202 for managing the control plane and/or control plane processing of packets associated with consolidation encodings representing designated receivers in a bit string. Packet switching device 200 also includes other cards 204 (e.g., service cards, blades) which include processing elements that are used in one embodiment to process packets associated with consolidation encodings representing designated receivers in a bit string, and some communication mechanism 203 (e.g., bus, switching fabric, and/or matrix, etc.) for allowing its different entities 201, 202, 204 and 205 to communicate.

Line cards 201 and 205 typically perform the actions of being both an ingress and egress line card, in regards to multiple other particular packets and/or packet streams being received by, or sent from, packet switching device 200. In one embodiment, line cards 201 and/or 205 use a tie-breaking selection ordering of manipulated ingress point identifiers in determining which packets/cells to send before other packets/cells having a same timestamp.

FIG. 2B is a block diagram of an apparatus 220 used in one embodiment associated with consolidation encodings representing designated receivers in a bit string. In one embodiment, apparatus 220 performs one or more processes, or portions thereof, corresponding to one of the flow diagrams illustrated or otherwise described herein, and/or illustrated in another diagram or otherwise described herein.

In one embodiment, apparatus 220 includes one or more processor(s) 221 (typically with on-chip memory), memory 222, storage device(s) 223, specialized component(s) 225 (e.g. optimized hardware such as for performing lookup and/or packet processing operations, etc.), and interface(s) 227 for communicating information (e.g., sending and receiving packets, user-interfaces, displaying information, etc.), which are typically communicatively coupled via one or more communications mechanisms 229 (e.g., bus, links, switching fabric, matrix), with the communications paths typically tailored to meet the needs of a particular application.

Various embodiments of apparatus 220 may include more or fewer elements. The operation of apparatus 220 is typically controlled by processor(s) 221 using memory 222 and storage device(s) 223 to perform one or more tasks or processes. Memory 222 is one type of computer-readable/computer-storage medium, and typically comprises random access memory (RAM), read only memory (ROM), flash memory, integrated circuits, and/or other memory components. Memory 222 typically stores computer-executable instructions to be executed by processor(s) 221 and/or data which is manipulated by processor(s) 221 for implementing functionality in accordance with an embodiment. Storage device(s) 223 are another type of computer-readable medium, and typically comprise solid state storage media, disk drives, diskettes, networked services, tape drives, and other storage devices. Storage device(s) 223 typically store computer-executable instructions to be executed by processor(s) 221 and/or data which is manipulated by processor(s) 221 for implementing functionality in accordance with an embodiment.

Figure 3:
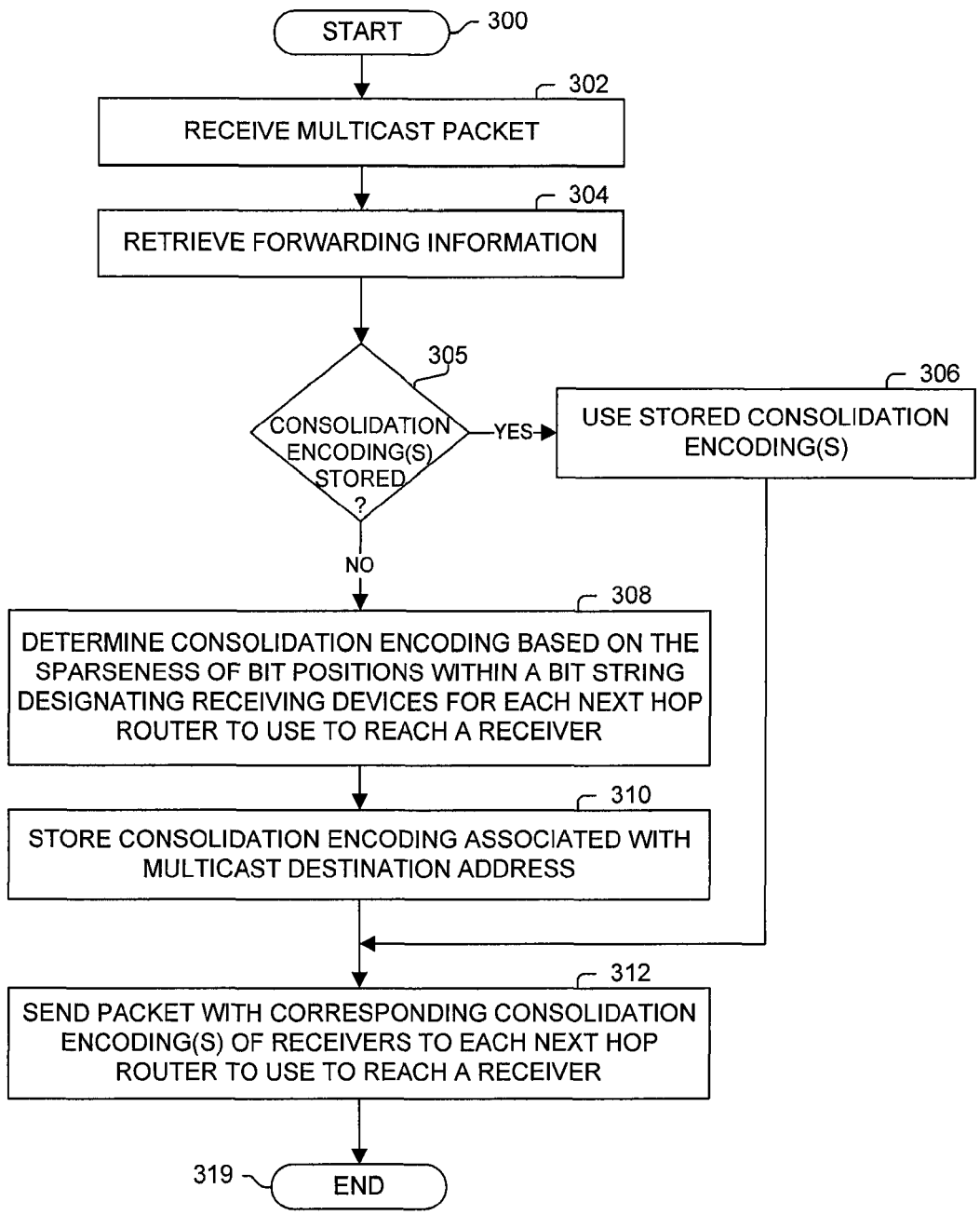
FIG. 3 illustrates processes according to one embodiment.

FIG. 3 illustrates processes according to one embodiment, such as, but not limited to being performed by a packet switching device on the edge of a network that forwards multicast packets based on a bit string, with bit positions corresponding to packet switching devices of the network.

Note, the term "bit string" is used instead of BIER's "BitString" to emphasize that embodiments are not limited BIER implementations.

Processing of the flow diagram of FIG. 3 begins with process block 300. In process block 302, a multicast packet is received. In process block 304, forwarding information (e.g., a bit string denoting the receiving packet switching devices) is retrieved from a multicast forwarding data structure. As determined in process block 305, if consolidation encoding(s) are stored for the multicast address, then processing proceeds to process block 306 to retrieve these consolidation encoding(s), else processing progresses through process blocks 308 and 310 to determine these consolidation encoding(s). Processing then continues with process block 312.

Instead of sending a full bit string, one embodiment sends one or more consolidation encodings of the bit string based on the sparseness of bit positions within the bit string corresponding to designated receiving packet switching devices of the particular multicast flow.

In one embodiment in a network supporting four thousand packet switching devices, a bit string of four thousand bits are used. If there are only a few designated receiving packet switching devices, it might be more efficient based on the sparseness, to simply list these few packet switching devices as it only takes twelve bits to represent a single position in a range of 0-4095, and three positions can be represented in three times twelve or thirty-six bits. If these three (or more) bits are contiguous, they also could be represented by a start position and an ending position. If these bits are relatively close together, they could be represented by a starting position (twelve bits) followed by a bitmap of some length encompassing these bits. One embodiment uses one or more sequences of a starting position and then a predetermined-size of bitmap.

One embodiment, based on the predetermined-size of the bitmap uses a corresponding starting position index identifying which number in a sequence of uniform predetermined-size bitmaps is being represented.

In one such embodiment, a bit string 4096 bits is used. For a bitmap size of thirty-two bits, there are 128 such bitmaps (i.e., 128 sub-bitmaps of 4096 bit string—as 128 is 4096 divided by 32). To represent which of the 128 bitmaps is being specified requires seven bits. In one embodiment, each bitmap portion of thirty-two bits is represented by thirty-nine bits. Only these bitmaps having a corresponding designated receiving packet switching device are included in the header of the multicast packet being sent (e.g., instead of the 4096-bit bit string).

One embodiment uses different sizes of bitmaps for different multicast packets and selects which consolidation encoding manner based on the sparseness of the designated receiving packet switching devices in the bit string. In one network supporting a bit string of 4096 bits, the following encoding manners are used:
- bitmap size of 32, bitmap position 7 bits (total of 39 bits for each bitmap);
- bitmap size of 16, bitmap position 8 bits (total of 24 bits for each bitmap);
- bitmap size of 8, bitmap position 9 bits (total of 17 bits for each bitmap);
- bitmap size of 4, bitmap position 10 bits (total of 14 bits for each bitmap);
- bitmap size of 2, bitmap position 11 bits (total of 13 bits for each bitmap); and
- bitmap size of 0, bitmap position 12 bits (total of 12 bits for each bitmap).

Note, one embodiment does not use a bitmap size of one because it is implicit that the bit is set in this context by specifying the bit position.

Figure 4:
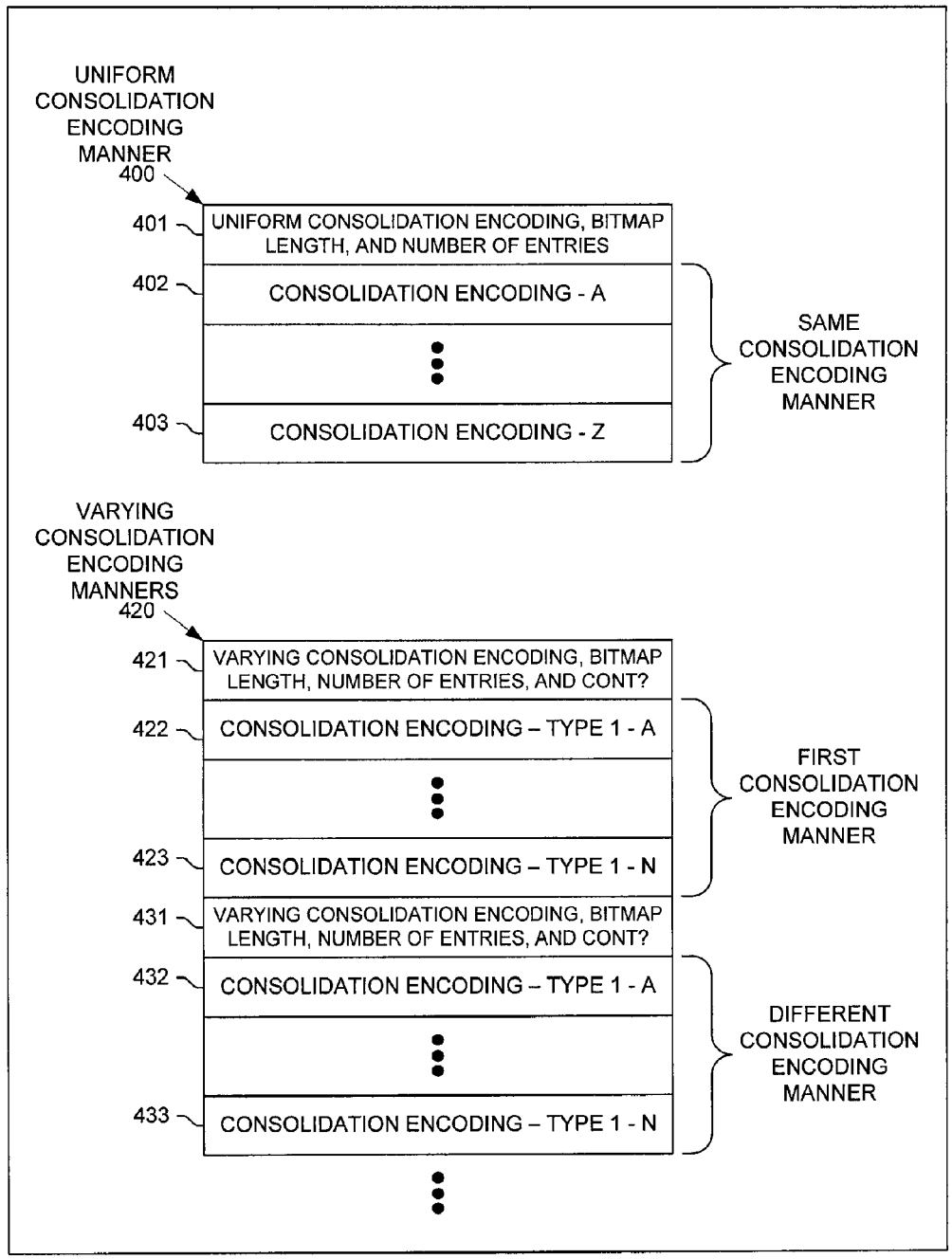
FIG. 4 illustrates consolidation encodings with a packet according to one embodiment.

Referring to FIG. 4, illustrated is a representation 400 used in one embodiment for a uniform consolidation encoding method used in a packet to represent the designated receiving packet switching devices in the bit string (e.g., the set bits). Field 401 identifies that the packet contains a uniform consolidation (i.e., a single sequence 402-403 of entries of the same consolidation manner), the bitmap length used, and the number of entries. In one embodiment, an end sequence bit or field is used to designate the end of the sequence, possibly instead of the number of entries.

FIG. 4 also illustrates a representation 420 used in one embodiment for a varying consolidation encoding method used in a packet to represent the designated receiving packet switching devices in the bit string (e.g., the set bits). Field 421 identifies that the packet contains a varying consolidation (i.e., a first sequence 422-423 of entries of the same consolidation manner), the bitmap length used, the number of entries, and whether following is another such sequence 431-433), typically using a different consolidation encoding manner. In one embodiment, an end sequence bit or field is used to designate the end of the sequence, possibly instead of the number of entries.

In one embodiment, the varying consolidation encoding manner representation 400 is used when there are one or more portions of the bit string that is not sparse and can be represented more efficiently using a large bitmap, with sparse portions of the bit string more efficiently consolidation encoding using a smaller bitmap.

Returning to the processing of FIG. 3, as determined in process block 305, if consolidation encoding(s) are stored for the multicast address, then processing proceeds to process block 305 to retrieve these consolidation encoding(s) then continues with process block 312, else processing proceeds to process block 308. In process block 308, the consolidation encoding (using one or more consolidation encoding manners) is determined based on the sparseness of bit positions within a bit string designating receiving devices for each next hop router to use to reach a receiver designated in the bit string. In process block 310, this determined consolidation encoding is stored as being associated with the multicast destination address. In process block 312, a packet is sent out of the packet switching device to each next hop packet switching device used to reach a designated receiver, the with the packet including in its header the corresponding consolidation encoding. Processing of the flow diagram of FIG. 3 is complete as indicated by process block 319.

Figure 5:
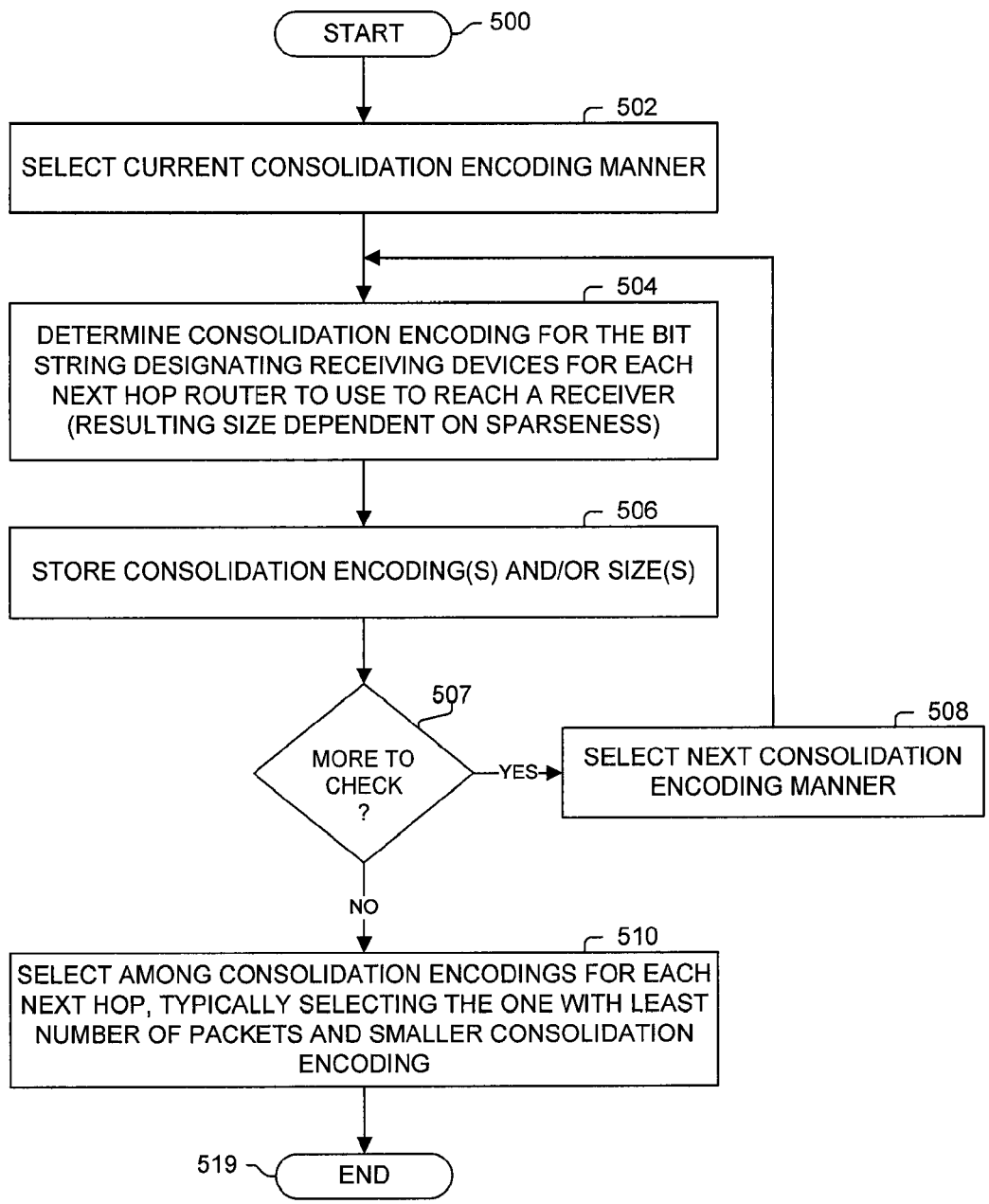
FIG. 5 illustrates processes according to one embodiment.

FIG. 5 illustrates processing according to one embodiment to determine a single consolidation encoding manner to use for a given bit string (e.g., one embodiment uses this processing in performing process block 308 of FIG. 3). Processing of the flow diagram of FIG. 5 begins with process block 500. In process block 502, a current consolidation encoding manner is selected (e.g., a bitmap size). In process block 504, the consolidation encoding for the bit string designating receiving devices is determined for each next hop router to use to reach a receiver with the resulting size dependent on the sparseness of the bits representing the designated receiving devices. In process block 506, these consolidation encoding(s) and their size(s) (e.g., one for each next hop packet switching device) are stored. When there are more consolidation encoding manners to check as determined in process block 507, then in process block 508 the next consolidation manner is selected and processing returns to process block 504. Otherwise, when there are no more consolidation encoding manners to check as determined in process block 507, then in process block 510, for each next hop packet switching device, a consolidation encoding is selected typically based on the overall size of the consolidation encoding. Processing of the flow diagram of FIG. 5 is complete as indicated by process block 519.

Figure 6:
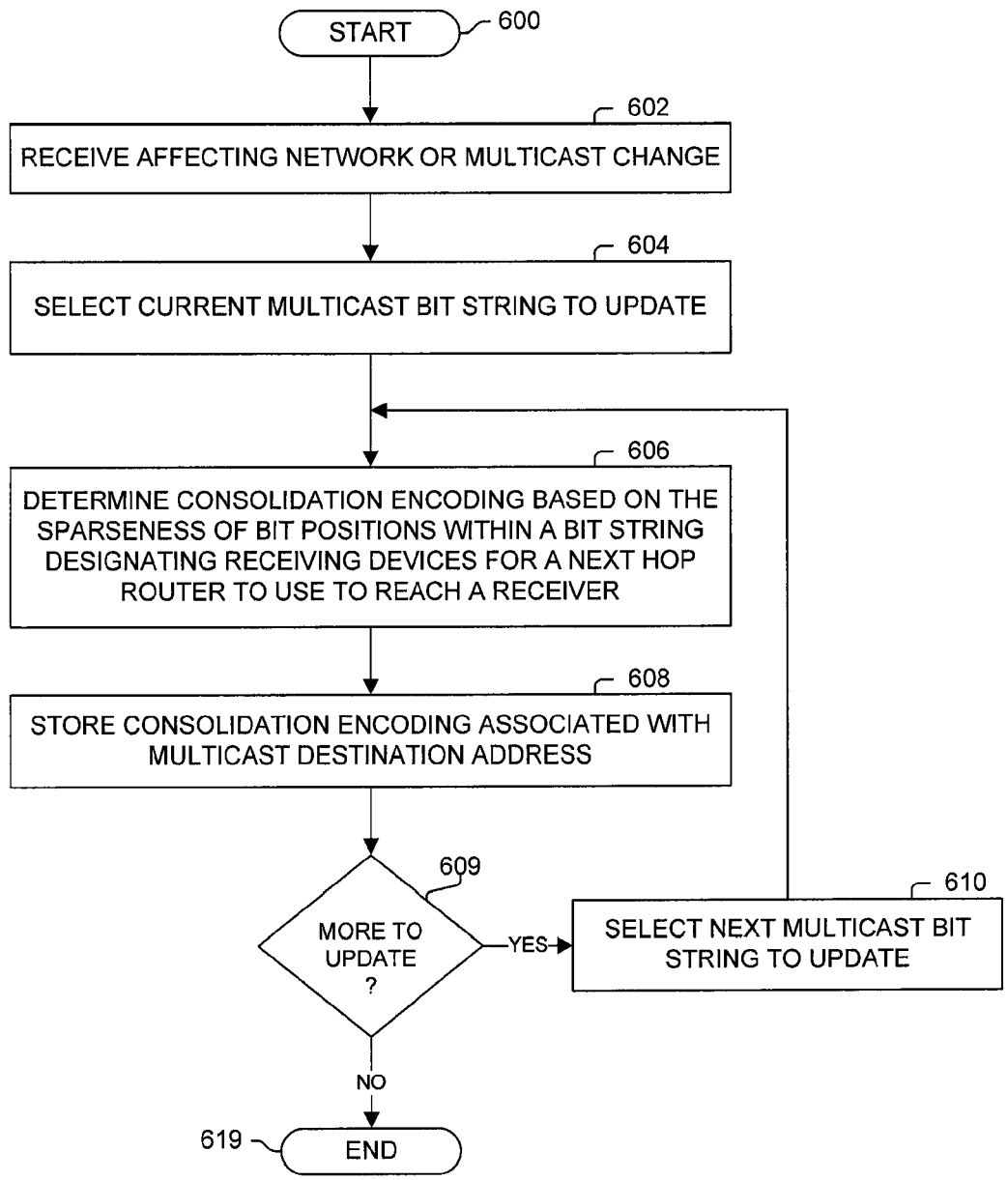
FIG. 6 illustrates processes according to one embodiment.

FIG. 6 illustrates a process performed in one embodiment by a packet switching device. Processing of the flow diagram of FIG. 6 begins with process block 600. In process block 602, a network or multicast (e.g., subscription) change is received that affects at least one stored consolidation encoding. In one embodiment, consolidation encodings are not stored, but rather determined for each packet. In process block 604, an affected multicast bit string is selected (e.g., a bit string corresponding to one or more multicast addresses). In process block 606, the new consolidation encoding is determined based on the sparseness of bit positions within a bit string designating receiving devices for a next hop router to use to reach a receiver. In process block 608, the new consolidation encoding is stored in a manner to associate it with a corresponding multicast address. As determined in process block 609, if there are more bit strings to update their consolidation encoding, then in process block 610, a next multicast bit string to update is selected and processing returns to process block 606. Otherwise, there are no more bit strings to update their consolidation encoding as determined in process block 609, and processing of the flow diagram of FIG. 6 is complete as indicated by process block 619.

Figure 7:
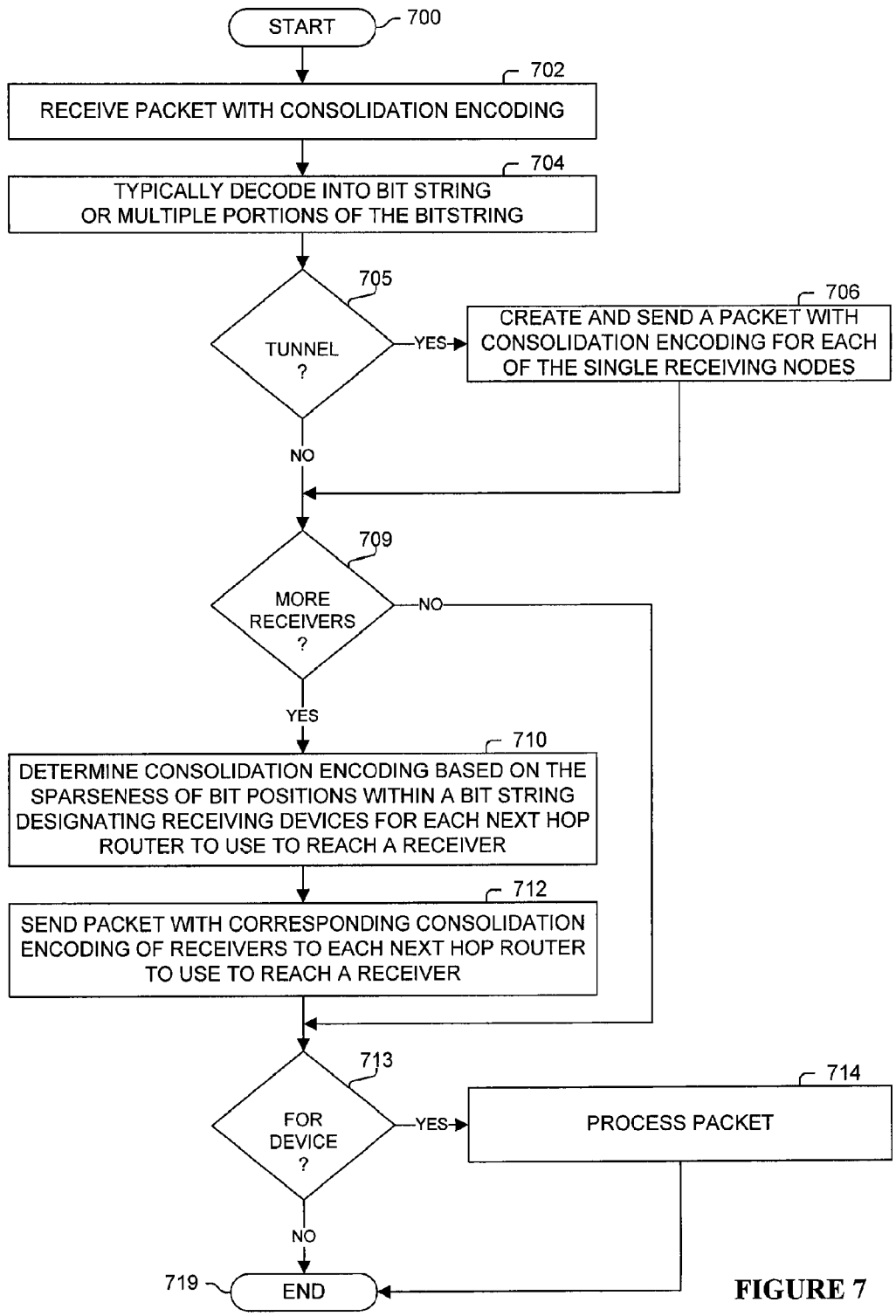
FIG. 7 illustrates processes according to one embodiment.

FIG. 7 illustrates a process performed in one embodiment, such as by a packet switching device. Processing of the flow diagram of FIG. 7 begins with process block 700. In process block 702, a packet is received with its consolidation encoding included in the header of the packet. Process block 704 is typically performed to decode the consolidation encoding into the original bit string. As determined in process block 705, if a copy of the packet is to be sent in over a tunnel to a packet switching device for one or more packet switching devices, then in process block 706, the packet is created and sent to each of these packet switching devices over their corresponding tunnel, typically with a consolidation encoding of a single packet switching device (e.g., the packet switching device at the other end of the tunnel). Such as shown in FIG. 1, if a network includes packet switching devices that do not support consolidation encoding or even multicasting using a bit string but these non-supporting packet switching devices are used to reach a supporting packet switching device, a tunnel (e.g., Internet Protocol tunnel, Multiprotocol Label Switching tunnel) is used to reach the supporting packet switching device. Processing of the flow diagram of FIG. 7 proceeds to process block 709.

As determined in process block 709, if there are no more receivers to which to send the packet, then processing proceeds to process block 713; otherwise, processing proceeds to process block 710. In process block 710, consolidation encoding is determined based on the sparseness of bit positions within a bit string designating receiving devices for each next hop router to use to reach a receiver. In process block 712, a packet is sent with its corresponding consolidation encoding of receivers to each next hop router to use to reach a receiver. As determined in process block 713, if the received multicast packet is to be consumed by this processing packet switching device (e.g., it is one of the designated packet switching devices), then in process block 714, the packet is processed. Processing of the flow diagram of FIG. 7 is complete as indicated by process block 719.

In view of the many possible embodiments to which the principles of the disclosure may be applied, it will be appreciated that the embodiments and aspects thereof described herein with respect to the drawings/figures are only illustrative and should not be taken as limiting the scope of the disclosure. For example, and as would be apparent to one skilled in the art, many of the process block operations can be re-ordered to be performed before, after, or substantially concurrent with other operations. Also, many different forms of data structures could be used in various embodiments. The disclosure as described herein contemplates all such embodiments as may come within the scope of the following claims and equivalents thereof.

What is claimed is:

1. A method, comprising:
performing operations by a packet switching device, with said operations comprising for each particular multicast flow of a plurality of multicast flows of packets:
selecting a particular consolidation encoding of a plurality of consolidation encodings based on the sparseness of bit positions within a bit string corresponding to designated receiving packet switching devices of the particular multicast flow; and
sending, from the packet switching device, one or more packets corresponding to said particular packet, with each of these one or more packets including designated receiving packet switching devices of the particular multicast flow in the header of said particular packet according to the particular consolidation encoding.

2. The method of claim 1, wherein different consolidation encodings of the plurality of consolidation encodings are used for at least two different multicast flows of the plurality of multicast flows of packets.

3. The method of claim 2, wherein each of said two different consolidation encodings is a uniform consolidation encoding using a same manner of encoding portions of the bit string.

4. The method of claim 2, wherein at least one of said two different consolidation encodings is a varying consolidation encoding using at least two different manners of encoding portions of the bit string.

5. The method of claim 1, wherein each of said receiving packet switching devices is Bit Index Explicit Replication (BIER) Bit-Forwarding Router (BFR).

6. The method of claim 5, wherein the packet switching device is a BIER edge packet switching device.

7. A method, comprising:
performing operations by a particular packet switching device, with said operations including:
receiving a particular packet including a bitmap designating a plurality of receiving packet switching devices in the header of the particular packet;
determining that the plurality of receiving packet switching devices are to be reached by at least two different next hop packet switching devices from the particular packet switching device; and
for each particular next hop packet switching device of said at least two different next hop packet switching devices, selecting a particular consolidation encoding of a plurality of consolidation encodings based on the sparseness of bit positions within a bit string corresponding to designated receiving packet switching devices to be reached via said particular next hop packet switching device, and sending a particular packet to said particular next hop packet switching device with the particular packet including said designated receiving packet switching devices to be reached via said particular next hop packet switching device in the header of said particular packet according to the particular consolidation encoding.

8. The method of claim 7, wherein for at least one next hop packet switching device which is not a Bit Index Explicit Replication (BIER) Bit-Forwarding Router (BFR) of said at least two different next hop packet switching devices the operation of sending the particular packet includes encapsulating said particular packet and sending said encapsulated particular packet through a tunnel to one of said designated receiving packet switching devices.

9. The method of claim 7, wherein different consolidation encodings of the plurality of consolidation encodings are used for at least two different multicast flows of the plurality of multicast flows of packets.

10. The method of claim 9, wherein each of said two different consolidation encodings is a uniform consolidation encoding using a same manner of encoding portions of the bit string.

11. The method of claim 9, wherein at least one of said two different consolidation encodings is a varying consolidation encoding using at least two different manners of encoding portions of the bit string.

12. The method of claim 7, wherein each of said receiving packet switching devices is Bit Index Explicit Replication (BIER) Bit-Forwarding Router (BFR).

13. The method of claim 12, wherein the packet switching device is a BIER edge packet switching device.

14. The method of claim 7, wherein for at least one next hop packet switching device of said at least two different next hop packet switching devices the operation of sending the particular packet includes encapsulating said particular packet and sending said encapsulated particular packet through a tunnel to one of said designated receiving packet switching devices.

15. A packet switching device, comprising:
a plurality of interfaces configured to send and receive packets; and
one or more packet switching mechanisms configured to packet switch packets among said interfaces;
wherein the packet switching device is configured to perform operations, with said operations including for each particular multicast flow of a plurality of multicast flows of packets:
selecting a particular consolidation encoding of a plurality of consolidation encodings based on the sparseness of bit positions within a bit string corresponding to designated receiving packet switching devices of the particular multicast flow, and
sending, from the packet switching device, one or more packets corresponding to said particular packet, with each of these one or more packets including designated receiving packet switching devices of the particular multicast flow in the header of said particular packet according to the particular consolidation encoding.

16. The packet switching device of claim 15, wherein different consolidation encodings of the plurality of consolidation encodings are used for at least two different multicast flows of the plurality of multicast flows of packets.

17. The packet switching device of claim 16, wherein each of said two different consolidation encodings is a uniform consolidation encoding using a same manner of encoding portions of the bit string.

18. The packet switching device of claim 16, wherein at least one of said two different consolidation encodings is a varying consolidation encoding using at least two different manners of encoding portions of the bit string.

19. The packet switching device of claim 15, wherein each of said receiving packet switching devices is Bit Index Explicit Replication (BIER) Bit-Forwarding Router (BFR).

20. The packet switching device of claim 19, wherein the packet switching device is a BIER edge packet switching device.

* * * * *